United States Patent [19]

Russell

[11] 4,242,765
[45] Jan. 6, 1981

[54] WATER SAVING COMMODE

[76] Inventor: Joyce A. Russell, 858 W. 41st St., Houston, Tex. 77018

[21] Appl. No.: 67,458

[22] Filed: Aug. 17, 1979

[51] Int. Cl.³ .............................................. E03D 1/00
[52] U.S. Cl. .......................................... 4/321; 4/415
[58] Field of Search .................... 4/321, 322, 323, 317, 4/319, 365, 415, 1, 320, 111, 118, DIG. 19, 316, 311, DIG. 11, 216

[56] References Cited

U.S. PATENT DOCUMENTS

| 932,822 | 8/1909 | Smith | 4/322 |
| 932,824 | 8/1909 | Smith | 4/322 |
| 1,113,186 | 10/1914 | Berry | 4/322 |
| 1,130,441 | 3/1915 | Somerville | 4/323 |
| 1,138,486 | 5/1915 | Kelley et al. | 4/322 |
| 1,377,185 | 5/1921 | Corry | 4/322 |
| 1,422,953 | 7/1922 | Frank | 4/322 |
| 2,755,482 | 7/1956 | Goins | 4/322 |
| 3,040,333 | 6/1962 | Merrill | 4/323 |
| 3,183,525 | 5/1965 | O'Brien et al. | 4/321 X |
| 3,440,669 | 4/1969 | Boester | 4/321 |

Primary Examiner—Henry K. Artis
Attorney, Agent, or Firm—Klaus D. Thoma; Ned L. Conley; Murray Robinson

[57] ABSTRACT

A waste disposal system including a toilet receptacle in controlled fluid communication with a holding tank. Just enough fluid is released into the toilet to flush wastes into the holding tank. The holding tank accumulates wastes, flush fluid and waste fluid from other sources until sufficient wastes accumulate to actuate a valve between the holding tank and a sewer.

7 Claims, 2 Drawing Figures

WATER SAVING COMMODE

BACKGROUND OF THE INVENTION

1. Field of the Invention

The present invention is generally related to waste disposal equipment and more specifically relates to a toilet designed to conserve water.

2. Background of the Prior Art

Disposal of human waste is an increasing problem. The modern toilet, unfortunately, requires a large amount of water to operate. This water is required to: (i) remove the waste from the bowl of the toilet and (ii) flush the waste down through the domestic sewer system into sewer mains. Those skilled in the art have long known that a relatively small amount of water will suffice to flush the wastes out of the toilet bowl. Most of the water used by conventional toilets eral types of toilets designed to conserve water. One such system is a recirculating toilet. This device conserves flush water by separating solid waste from waste water, sterilizing or filtering the waste water, then recycling the water to use again as flush media. Examples of such systems may be found in U.S. Pat. Nos. 4,115,876, issued to Cole, Jr., et al. on Sept. 26, 1978; 3,673,614 issued to Claunch on July 4, 1972; 3,974,528 issued to Claunch on Aug. 17, 1976; 1,303,358 issued to Montgomery on May 13, 1919; and 4,063,315 issued to Carolan et al. on Dec. 20, 1977. Unfortunately, recirculating toilets have the disadvantage of being relatively expensive and complicated compared to ordinary flush toilets. Further, they may require the periodic addition of chemicals and other maintenance.

Other toilets designed to conserve flush liquids use a vacuum system to assist movement of waste products out of the toilet and through plumbing. Such toilets are described in U.S. Pat. Nos. 4,063,315 issued to Carolan, et al. on Dec. 20, 1977; 4,120,312 issued to Michael on Oct. 17, 1978; and 3,629,099 issued to Gahmberg on Dec. 21, 1971. One drawback of these systems is that they require a vacuum source, i.e., installation of an additional apparatus for generating a vacuum must be available.

A gravity sewage disposal apparatus conserves water by utilizing waste water from other drains (such as shower or lavatory drains) to wash excreta from a holding area into the sewer main is disclosed in U.S. Pat. No. 3,843,976 issued to Miya on Oct. 29, 1974. This device uses no fresh water or other liquids to rinse waste products from the toilet bowl. Rather, when flushed, Miya uses a foam to move excreta away from the toilet bowl to a trap. A tilting basin fills with water from other drains and tilts at a predetermined level, spilling its contents into the trap and flushing wastes down a sewer line. This system has the disadvantage of needing a special foam to combat odor and move the excreta into a trap.

Some elements of the present invention are old. For example, holding tanks for temporarily storing raw waste are old. Timer operated valves for controlling both the flow of the flush medium into the toilet bowl and the outflow of waste from the toilet to the holding tank are described in U.S. Pat. No. 4,063,315 issued to Carolan, et al. on Dec. 20, 1977. A valve for discharging waste into the sewer pipe operated in part by gravity is disclosed in U.S. Pat. No. 3,629,099 issued to Galmberg on Dec. 21, 1971. However, the Galmberg device requires a vacuum to assist in the operation of the valve.

SUMMARY OF THE INVENTION

The invention comprises a modified toilet bowl assembly in functional fluid connection with a raw waste holding tank, which, in tof waste occurs in two stages: (1) removal of waste from the toilet bowl to the holding tank; and (2) discharge of waste from the holding tank into the sewer.

When the toilet is flushed, a small amount of pressurized water sprays into the toilet bowl. An instant later, a valve in the base of the toilet bowl opens, allowing the excreta to wash into the holding tank. The base valve then closes and the toilet bowl partially fills with water for the next flush. Next, effluent from other drains, flush water, and excreta accumulate in the holding tank. When the accumulation is sufficient, a biased valve in the base of the holding tank opens, emptying the waste products into the sewer or outlet pipe.

The purpose of the present invention is to conserve fresh water by releasing only enough water to complete the first stage of flushing, i.e. the small amount of fresh water used to move waste out of the toilet bowl to the holding tank. The second phase of disposal, moving the waste from the holding tank to the sewer pipe, is accomplished in part by utilizing the accumulated waste water from other drains and in part by using the weight of the excreta itself.

Another purpose of the present invention is to save water without resorting to the use of special foaming agents or special flush fluids. Ordinary tap water is sufficient to operate the toilet. Moreover, the invention does not require a vacuum source or means to filter and recycle the flush water.

DESCRIPTION OF THE PREFERRED EMBODIMENT

Figure 1:
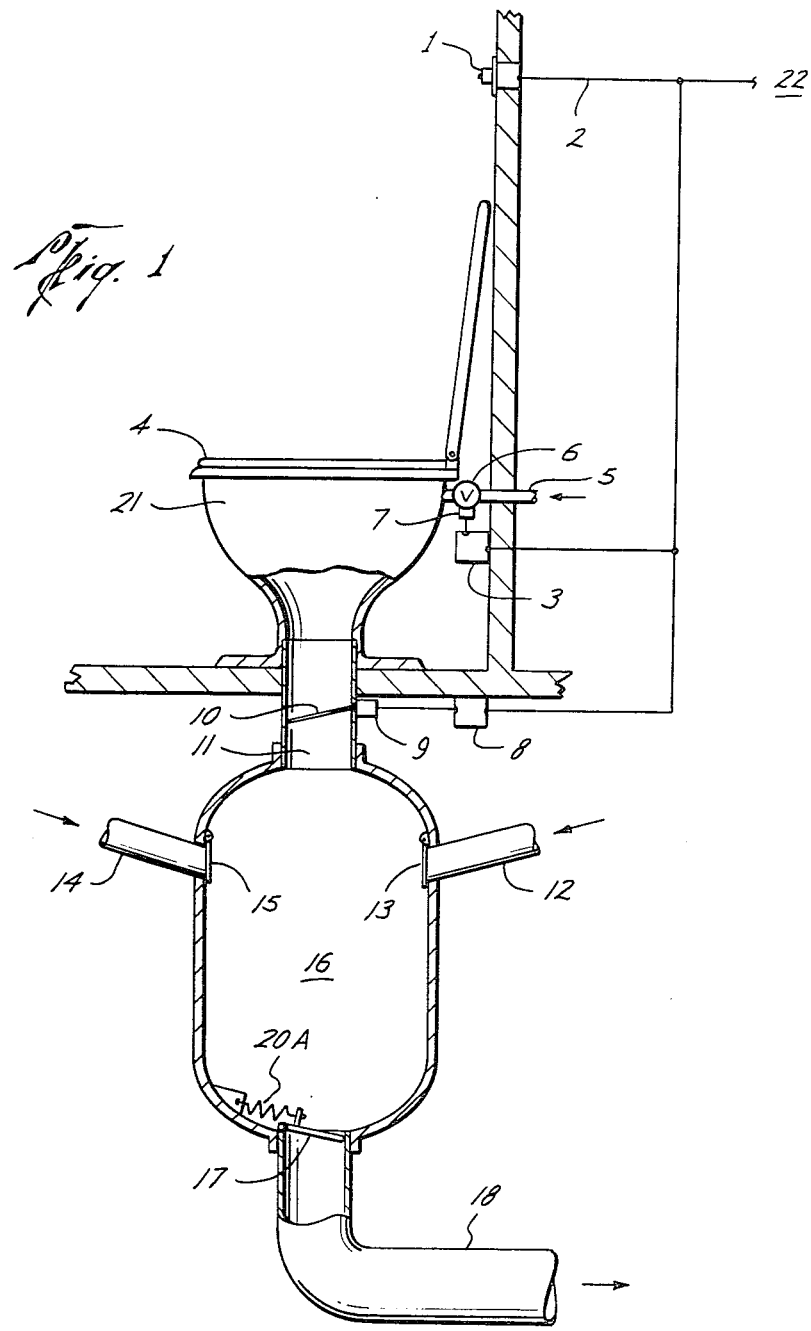
FIG. 1 is a schematic representation of the preferred embodiment of the present invention.

FIG. 1 shows a toilet assembly and holding tank constructed according to the preferred embodiment of the present invention. In FIG. 1 toilet 4 has a bowl 21 that is in fluid connection through control valve 10 and pipe segment 11 to holding tank 16. Tank 16 is also in fluid connection with waste stream input lines 14 and 12. Lines 14 and 12 are equipped with check valves 15 and 13, respectively. The lower portion of holding tank 16 is in fluid communication with waste drain 18. Biased valve 17 equipped with biasing means 20A is located at the bottom of holding tank 16 and equipped to close off holding tank 16 from fluid communication with waste conduit 18. Waste conduit 18 is connected to sewer mains, not shown.

Toilet 4 may be made of porcelain or any other suitable material. It should be noted that toilet 4 does not have a p-trap, which is found in conventional toilets, but merely a straight-through fluid passage 11 from the bottom of toilet bowl 21 to holding tank 16. Valve 10, which is a remotely operated flapper valve, performs the function of a p-trap.

Holding tank 16 may be made of any material that meets National Plumbing Codes and is otherwise usable to contain sewage. The tank should be hermetic and all entry points into the tank, i.e., connecting means 11, waste input lines 14 and 12, and output sewer conduit 18, should be hermetically sealed to the tank by screw threads, soldering, or other well known expedients.

Control system 22 comprises actuator means 1, which may be a electric, pneumatic, or fluidic control. The preferred embodiment of the present invention uses hydraulic controls, valves and timers. Control means 1 is connected via control line 2 to first timer means 3 and second timer means 8. These timer means may be any convenient device such as a electronic timer or hydraulic accumulator for receiving the control impulse generated by control means 1 and then outputting a delayed control signal at a controllably later time. Input water line 5 is connected to one side of control valve 7. The output side of control valve 7 is connected through input fitting 6 to the spray nozzles inside the toilet bowl 21. These nozzles are described in greater detail in that portion of the specification discussing FIG. 2, below.

The output of timer 3 is connected functionally to valve 7. The output of timer 8 is connected functionally to valve controller 9 associated with flapper valve 10.

Functionally, actuating control means 1 sends a signal via hydraulic line 2 to timer means 3 and timer means 8. It is anticipated that this action would normally be performed after a user of the present invention deposits excreta in toilet 4.

After a relatively short period of time, timer 3 opens hydraulic control valve 7 for a short period of time. Opening control valve 7 allows water to flow into the toilet bowl through the annular spray system described in more detail in the portion of the discussion dealing with FIG. 2, below. This spray of liquid washes the excreta from the inner walls of toilet bowl 4 and causes it to come to rest on the upper side of flapper valve 10, which is closed. A small amount of water will already be in the bowl, as in a conventional toilet. Timer 3 then turns off the flow of water. The interval of time valve 7 is open is selected to use the minimum amount of water adequate to wash the excreta down to the upper surface of flapper valve 10.

Some period of time after timer 3 has opened valve 7, timer 8, which may be a hydraulic accumulator, energizes hydraulicly actuated valve operator 9 to open flapper valve 10. Alternatively, valve 10 may be opened by the accumulated weight of the water in the toilet bowl. The accumulated excreta is then carried through connector means 11 into holding tank 16. It will be appreciated that timer 8 may be set to open flapper valve 10 either while valve 7 is open or closed, depending on other system characteristics, such as the exact shape of the interior of toilet bowl 4 and/or the desirability of continuing the flow of water for a short period after flapper valve 10 has opened to remove excreta from the upper surface of said flapper valve. After the excreta and flushing water have passed into tank 16, flapper valve 10 closes. After flapper valve 10 closes, valve 7 opens and a small amount of standing water flows into the toilet bowl for the next flush.

Waste water from other utilities, such as bathing water, washing water from washing machines and sinks, and any other source of dirty water, flows into holding tank 16 through waste water input lines 14 and 12. Check valves 15 and 13 are located at the terminal end of waste water lines 14 and 12, respectively. Valves 15 and 13 act as check valves that allow water to enter holding tank 16, but hermetically seal to prevent the escape of sewer gases from the holding tank.

After a sufficient quantity of waste water from all sources, including waste water lines 12 and 14 and sewer line 11 has accumulated in tank 16, the biasing means 20A, which may be a spring, hydraulic or pneumatic actuator, or electric sensing system, opens bi-stable flapper valve 17. Opening bi-stable flapper valve 17 puts holding tank 16 in direct fluid communication with sewer 18. When valve 17 opens the accumulated waste water and sewage in holding tank 16 flows through sewer line 18 to a remote sewer system, not shown, which may be a septic tank or municipal sewer system.

Valve 17 is constructed so it opens when a predetermined amount of waste material has filled tank 16 and only returns to a closed position after substantially all this material has flowed out of the tank into sewer line 18.

Figure 2:
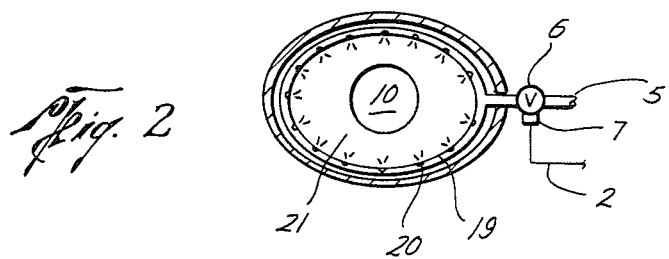
FIG. 2 is a partially cutaway top view of the toilet bowl showing the toilet bowl spray device.

FIG. 2 shows a partially cutaway top view of toilet 4. In this figure, like numbers indicate like structures.

Input water line 5 is connected to the input side of water control, remotely hydraulically, actuated valve 7. The output side of remotely actuated valve 7 is connected to input fitting 6. Input fitting 6 is in fluid communication with an annular spray ring 19. Annular spray ring 19 is provided with a plurality of spray jets 20. Structure 19 may be a hollow tube running around the underside of the periphery of toilet 4. Jets 20 are directed downward onto bowl 21 of toilet 4 so they will wash excreta deposited in the bowl onto the top of flapper valve 10.

When valve 7 is opened by a command from timer 3, water flows from delivery pipe 5 through fitting 6 and spray structure 19 out of holes 20 and wash excreta from the interior of bowl 21 onto the standing water over flapper valve 10.

It should be understood that the present invention uses only a minimal amount of water to wash excreta into holding tank 16. The majority of the water used to move the sewage through sewer pipe 18 in FIG. 1 to the main sewer system or septic tank, not shown, is provided by the other household waste water entering holding tank 16 through lines 14 and 12.

It should be further understood that the specific embodiment described in this specification is not intended to be limiting, but only shows the best embodiment known to the inventor. Many obvious adaptations of the present invention could be made by those skilled in the art without departing from the present invention. The present invention should therefore be limited only by the following claims and their equivalents.

I claim:
1. A waste removal system comprising:
a receptacle capable of receiving waste;
control means for controlling said waste's removal from said receptacle,
fluid delivery means responsive to said control means for introducing sufficient flush fluid into said receptacle to to flush waste from said receptacle;
valve means in fluid communication with said receptacle and responsive to said control means for controlling the exit of said waste and said flush from said receptacle;
a holding tank in fluid communication with said valve means and having an outlet leading to a sewer line;
at least one source of waste fluid other than said receptacle, said source being in fluid communication with said holding tank; and
bias valve means positioned for opening said holding tank outlet in response to the accumulation of a predetermined quantity of said waste, flush fluid and waste fluid, for controlling the flow of said accumulated wastes and fluids from said holding tank to the sewer line.

2. A waste removal system as in claim 1 wherein said receptacle is a toilet, said control means comprises an actuator means, first and second timing means responsive to said actuator means, and a first and second valve actuator responsive to said first and second timing means, respectively;

said fluid delivery means comprises, a water delivery pipe in fluid communication with the input side of a fluid control valve responsive to said first valve actuator, a spray ring in fluid communication with the output of said control valve, said spray ring being annularly proximate the interior upper portion of said toilet, said spray ring being provided with a plurality of openings; said openings being aligned so fluid flowing through them is directed so as to wash the interior of said toilet bowl;

said valve means is a hydraulically operated flapper valve responsive to said second valve actuator and capable of hermetically sealing said toilet bowl from fluid communication with said holding tank;

said source of waste fluid is the output of domestic drains;

said biased valve means is a spring-loaded flapper valve, said spring being adjusted to open when a sufficient quantity of fluids accumulates in said holding tank to sweep said wastes through a local sewer line.

3. A waste removal system as in claim 2 wherein said output from domestic drains is in fluid communication with the interior of the holding tank through at least one check valve capable of sealing said domestic drains against back pressure caused by sewer gas generated in said holding tank.

4. A waste removal system as in claim 2 wherein said control system comprises:

a hydraulic switch, said switch being electrically connected to first and second hydraulic timers, and said first timer operates to actuate said water inlet valve and, subsequent to this actuation, said second timer opens said flapper valve.

5. A waste removal system as in claim 4 wherein said first timer is adjusted to allow said water control valve to remain open only long enough to provide a quantity of water sufficient to move said waste from said receptacle into said holding tank and said second timer actuates said flapper valve only long enough to allow said waste to pass from said receptacle into said holding tank.

6. A system as in claim 5 wherein said water control valve releases a quantity of water into said toilet bowl after said flapper valve has shut.

7. A waste removal system as in claim 5 wherein said biased valve does not open until sufficient waste fluids have accumulated in the holding tank to wash said wastes through said local sewer pipes into said sewer mains and said biased flapper valve does not close once it is opened until substantially all the contents of said holding tank have passed into said sewers.

* * * * *